United States Patent [19]
Uchiyama et al.

[11] Patent Number: 5,804,784
[45] Date of Patent: Sep. 8, 1998

[54] LEVER SWITCH APPARATUS

[75] Inventors: Norio Uchiyama; Yoshio Hattori, both of Tokyo, Japan

[73] Assignee: Sony Corporation, Japan

[21] Appl. No.: 672,914

[22] Filed: Jun. 28, 1996

[30] Foreign Application Priority Data

Jul. 5, 1995 [JP] Japan ..................................... 7-192426

[51] Int. Cl.⁶ .............................. H01H 9/00; H01H 3/16; H01H 3/40
[52] U.S. Cl. ...................... 200/61.54; 200/4; 200/61.27; 200/500; 200/501
[58] Field of Search .......................... 200/4, 5 E, 61.27, 200/61.34, 61.35, 61.54, 500, 501

[56] References Cited

U.S. PATENT DOCUMENTS

| | | | |
|---|---|---|---|
| 3,754,106 | 8/1973 | MacDonald | 200/14 |
| 4,928,722 | 5/1990 | Walsh et al. | 137/881 |
| 5,107,243 | 4/1992 | Maeda | 338/172 |
| 5,272,290 | 12/1993 | Suzuki et al. | 200/4 |

FOREIGN PATENT DOCUMENTS 63-171931  11/1988  Japan .

Primary Examiner—Cassandra C. Spyrou
Assistant Examiner—Michael J. Hayes
Attorney, Agent, or Firm—Ronald P. Kananen

[57] ABSTRACT

A lever switch apparatus having a lever, a switch body, and a plurality of rotatively operated knobs, wherein a connection between the lever and the switch body is made with no wire involved. The lever 2 has a first knob 21 and a second knob 24 that are rotatively operated. The lever 2 holds a first shaft 22 and a second shaft 25 that are loosely fitted axially thereinto. The first shaft 22 is coupled at its one end 22A to the first knob 21 through a transmission 23, and at its other end 22B to the movable contact 11 in the switch body 1. The transmission 23 includes the first and second gears 211 and 221. The first shaft 22 has its axis 0 offset from a rotational axis P of the first knob 21.

6 Claims, 3 Drawing Sheets

LEVER SWITCH APPARATUS

BACKGROUND OF THE INVENTION

1. Field of the Invention

The present invention relates generally to switch apparatus and, in particular, to improvements in lever switch apparatus for use in, for example, so-called combination switches in which switches for a lighting system, wiper system, and turn signal system are integrated.

2. Description of the Related Art

A related type of lever switch apparatus has a plurality of knobs accommodated in a lever. For example, a lever used in a switch for a lighting system incorporates a plurality of rotatively operated knobs, such as lighting knobs for turning on and off small lamps and head lights and fog knobs for turning on and off fog lamps. Likewise, a lever used in a switch for operating a wiper system, as disclosed in Japanese Utility Model Preliminary Publication No. 63-171931, incorporates a plurality of rotatively operated knobs, such as a mode-selector knob for switching among the modes of operation of a wiper blade, i.e., high speed, low speed, and intermittent operations, a time-setting knob for setting an inoperative duration of the wiper blade in the intermittent mode, and a rear wiper knob for operating the rear wiper blade.

However, these related lever switch apparatus having a plurality of rotatively operated knobs have a construction in which the lever and switches cannot be connected with no wire therebetween. For example, the lever switch apparatus disclosed in Japanese Utility Model Preliminary Publication No. 63-171931 needs no wire for the mode-selector knob since movable contacts are operated by means of a rotative shaft. However, the time-setting knob and rear wiper knob incorporate switch contacts that are provided adjacent the knobs and operated to open and close by rotation of the knobs, and cords are required for transmitting on-signals and off-signals of the switch contacts to the switch body.

SUMMARY OF THE INVENTION

An object of the present invention is to solve the problems and drawbacks associated with the above-described related lever switch apparatus.

More specifically, it is an object of the present invention to provide a lever switch apparatus having a plurality of rotatively operated knobs, in which the lever and the switch body are connected with no wire therebetween.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

To overcome the problems associated with the prior art, the present invention provides a lever switch apparatus having a switch body and a lever connected at its base end to the switch body, and the lever having a plurality of knobs, characterized in that the lever has a plurality of shafts loosely fitted axially thereinto, and at least one of the shafts is coupled at its one end to the knob via a transmission and is engaged at its other end with a movable contact provided in the switch body.

The plurality of knobs of the lever switch apparatus preferably include a rotatively operated first knob to which a first shaft is coupled via a transmission, and the first shaft having an axis thereof offset from an axis about which the first knob rotates.

The transmission of the lever switch apparatus preferably includes a first gear and a second gear in a meshing relation with the first gear. One of the first and second gears is provided on the first knob, and the other is provided on the first shaft. The transmission also preferably includes a cam and a slidable end which slides on the surface of the cam. One of the cam and the slidable end is provided on the first knob, and the other is provided on the first shaft.

BRIEF DESCRIPTION OF THE DRAWINGS

The present invention will become more clearly appreciated as a description of the invention is made with reference to the accompanying drawings. In the drawings.

DETAILED DESCRIPTION OF THE PREFERRED EMBODIMENTS

Figure 2:
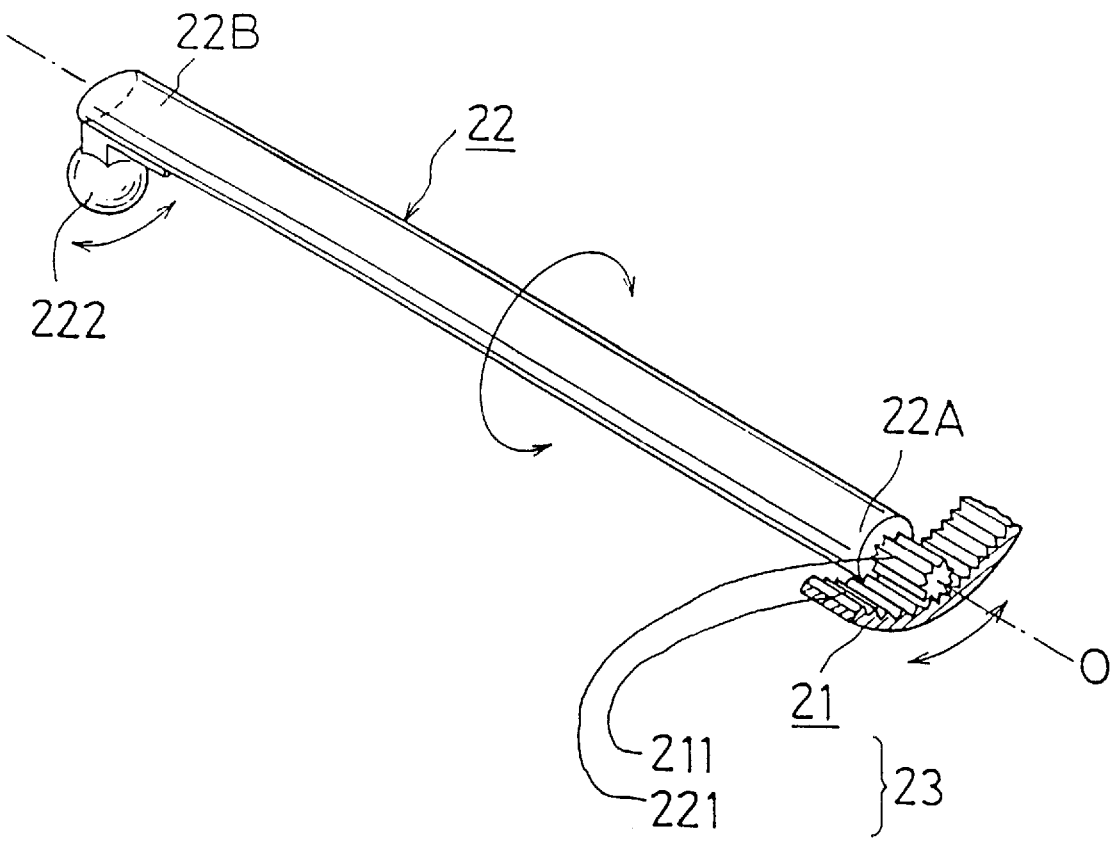
FIG. 2 is a perspective view of primarily the first shaft and the transmission shown in FIG. 1.
Figure 3:
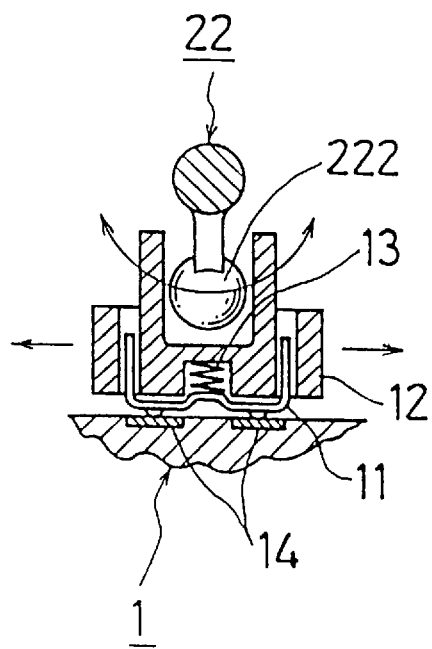
FIG. 3 is a cross-sectional view showing primarily a pertinent part of the movable block shown in FIG. 1.

A first embodiment of the invention will now be described with reference to FIGS. 1 to 3.

In the figures, numeral 1 denotes a switch body. The switch body 1 is provided with, for example, a first movable contact 11 for switching a fog lamp circuit, a second movable contact 15 for switching a lighting circuit, a third movable contact 16 for switching a head lamp circuit among the MAIN, DIMMER, and PASSING positions, and a fourth movable contact 17 for switching a turn signal lamp circuit. Of these movable contacts, the first movable contact 11 is urged by a spring 13 mounted on a movable block 12, as shown in FIG. 3, so that the movable contact 11 is in pressure contact engagement with the fixed contact 14 in the switch body 1. The movable block 12 engages a first drive piece 222 provided on one end 22B of a later described first shaft 22.

Numeral 2 denotes a lever. The lever 2 has a first knob 21 and a second knob 24 on its free and, and is connected at its base end to the switch body 1. The lever 2 holds a first shaft 22 and a second shaft 25 loosely fitted axially thereinto. The first shaft 22 is coupled at its one end 22A to the first knob 21 through a transmission 23, and at its other end 22B to the first movable contact 11 in the switch body 1 through the movable block 12.

The first and second knobs 21 and 24 are both rotatively operated knobs. As shown in FIG. 1, the first shaft 22 has its axis O offset from an axis P about which the first knob 21 rotates. The second knob 24 and the second shaft 25 coupled to the second knob 24 have their axes in line with the axis P.

The transmission 23 includes a first gear 211 and a second gear 221. As shown in FIG. 2, the second gear 221 is in meshing engagement with the first gear 211. For more detail, the first gear 211 is molded integrally with the first knob 21 and has its gear teeth formed on the inner arcuate surface of the first knob 21. The first shaft 22 is formed with the second gear 221 on one end 22A thereof and a first drive piece 222 on the other end 22B thereof. The first drive piece 222 engages the movable block 12.

The first embodiment of the aforementioned construction operates as follows: Rotating the first knob 21 causes the first gear 211 and second gear 221 of the transmission 23 to rotate, with the result that the first shaft 22 rotates in the same direction as the first knob 21 rotates. As a result, the first movable contact 11 engaging the end 22B of the first shaft 22 slides on the fixed contact 14, thereby switching the fog lamp circuit.

Rotating the second knob 24 causes the second shaft 25 fixed to the second knob 24 to rotate in the same direction as the second knob 24, so that the second operation piece 251 provided on the second shaft 25 causes the second movable contact 15 to move, thereby switching the lighting circuit.

Figure 1:
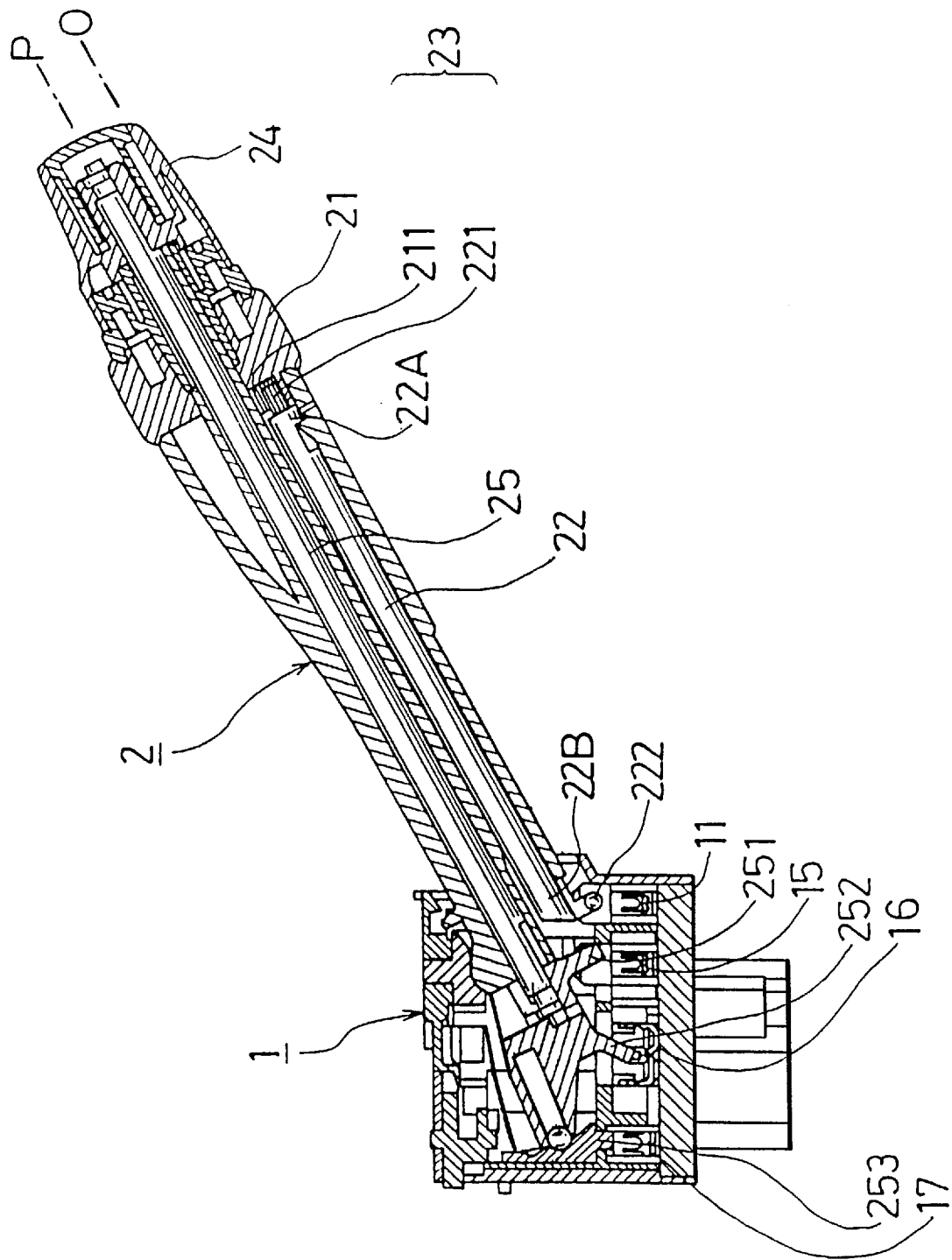
FIG. 1 is a cross-sectional view showing a first embodiment of the invention.

Operating the lever 2 in a vertical direction in FIG. 1 causes the third drive piece 252 to move the third movable contact 16, thereby switching the head lamp circuit among MAIN, DIMMER, and PASSING positions. Operating the lever 2 into the paper and out of the paper in FIG. 1 causes the fourth drive piece 253 to move the fourth movable contact 17, thereby switching the turn signal lamp circuit.

A second embodiment of the invention will now be described with reference to FIG. 4.

Numeral 1A denotes a switch body. The switch body 1A is provided with, for example, the first movable contact 11A for switching the fog lamp circuit. The switch body 1A also includes movable contacts for switching the lighting circuit, the head lamp circuit, and the turn signal lamp circuit, but a description of these elements is omitted since they are substantially similar to the corresponding elements described above for the first embodiment.

Figure 4:
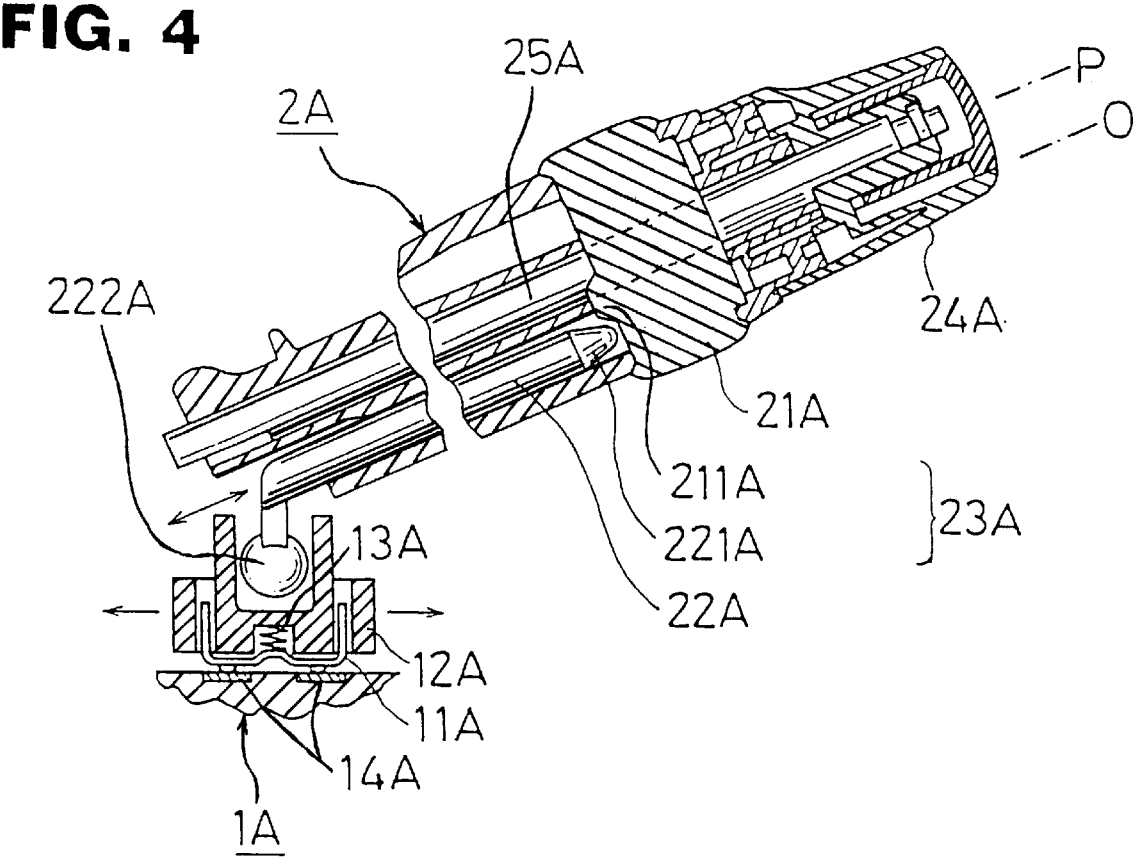
FIG. 4 is a cross-sectional view showing a second embodiment of the invention.

As shown in FIG. 4, the first movable contact 11A is urged by a spring 13A mounted on the movable block 12A for pressure contact with the fixed contact 14A of the switch body 1A. The movable block 12A engages the first drive piece 222A provided on the first shaft 22A.

Numeral 2A denotes a lever. The lever 2A has a first knob 21A and a second knob 24A on its free end, and is connected at its base and to the switch body 1A. The lever 2A holds a first shaft 22A and a second shaft 25A loosely fitted axially thereinto. The first shaft 22A is coupled at its one end to the first knob 21A through a transmission 23A, and at its other end to the first movable contact 11A in the switch body 1A through the movable block 12A.

The first and second knobs 21A and 24A are both rotatively operated knobs. The first shaft 22A has its axis 0 offset from an axis P about which the first knob 21A rotates. The second knob 24A and the second shaft 25A coupled to the second knob 24A have their axes in line with the axis P.

The transmission 23A includes a cam 211A and a slidable end 221A. For more detail, the cam 211A is molded integrally with the first knob 21A and has a cross section of a substantial trapezoid. The first shaft 22A has the slidable end 221A formed at one end thereof and a first drive piece 222A formed at the other end thereof. The first drive piece 222A engages the movable block 12A.

The second embodiment of the aforementioned construction operates as follows: Rotating the first knob 21A causes the cam 211A of the transmission 23A to push the slidable end 221A, so that the first shaft 22A moves in the axial direction of the lever 2A. Then, the first movable contact 11A engaged with one of the first shaft 22A slides on the fixed contact 14A, thereby switching the fog lamp circuit. The rest of the operation is the same as the first embodiment and description thereof is therefore omitted.

Figure 5:
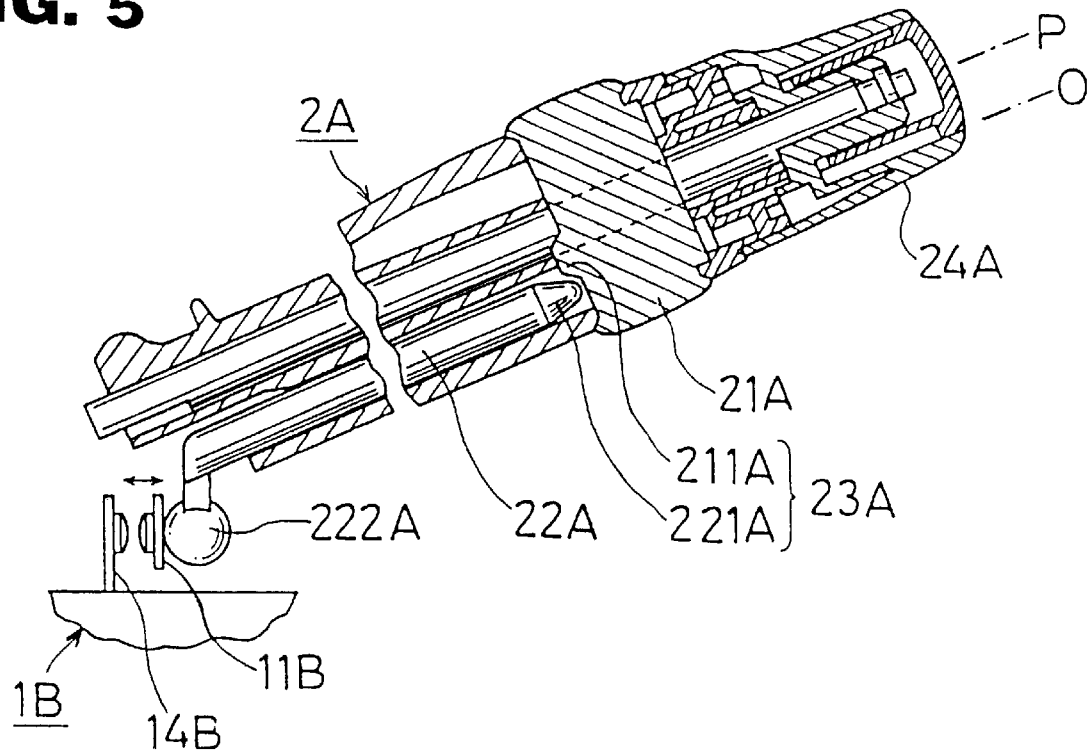
FIG. 5 is a cross-sectional view showing a third embodiment of the invention.

A third embodiment of the invention will now be described with reference to FIG. 5.

Numeral 1B denotes a switch body. The switch body 1B is provided with a first movable contact 11B that moves into and out of contact engagement with the fixed contact 14B to switch, for example, a fog lamp circuit. The rest of the construction is the same as that of the second embodiment and description thereof is therefore omitted.

The third embodiment of the aforementioned construction operates as follows: Rotating the first knob 21A causes the cam 211A of the transmission 23A to push the slidable end 221A, so that the first shaft 22A moves in a direction parallel with the axis of the lever 2A. Then, the first movable contact 11B engaging one end of the first shaft 22A is pushed by the first drive piece 222A, thereby causing the first movable contact 11B to move into contact engagement with the fixed contact 14B to switch the fog lamp circuit. The rest of the operation is the same as that of the first embodiment and description thereof is therefore omitted.

The present invention is of the aforementioned construction and operates as described above. The present invention provides a lever switch apparatus having a plurality of rotatively operated knobs, and the connection between the lever and the switch body is provided with no wire involved.

It will be appreciated that the present invention is not limited to the exact construction that has been described above and illustrated in the accompanying drawings, and that various modifications and changes can be made without departing from the scope and spirit thereof. It is intended that the scope of the invention protected only be limited by the appended claims.

What is claimed is:

1. A lever switch apparatus comprising:

a switch body (1);

a lever (2) having a base end connected to the switch body (1);

a plurality of knobs (21, 24) rotatably mounted on said lever (2);

a plurality of shafts (22, 25) disposed axially within said lever (2) for movement relative to said lever (2);

a first one (22) of the shafts having a first end (22A) coupled to a first one (21) of said knobs via a transmission means (23, 23A) and a second end (22B) coupled to a first movable contact (11, 11A, 11B) provided in the switch body (1, 1A, 1B); and a second one (25) of the shafts having a first end coupled to a second one (24) of said knobs and a second end coupled to a second movable contact (15) provided in the switch body.

2. The lever switch apparatus according to claim 1, wherein the first shaft (22) has a longitudinal axis (0) which is offset from an axis (P) about which the first knob (21) rotates.

3. The lever switch apparatus according to claim 1, wherein the transmission means (23) includes a first gear (211) and a second gear (221) in a meshing relation with the first gear (211), and one of the first and second gears (211, 221) is provided on the first knob (21) and the other is provided on the first shaft (22).

4. The lever switch apparatus according to claim 1, wherein the transmission means (23A) includes a cam (211A) and a slidable end (221A) which slides on the surface of the cam (211A), and one of the cam (211A) and the slidable end (221A) is provided on the first knob (21) and the other is provided on the first shaft (22).

5. The lever switch apparatus according to claim 1, further comprising a third drive piece (252) formed on the base end of the lever (2), said third drive piece (252) being coupled to a third movable contact (16) provided in the switch body (1, 1A, 1B) for movement of the third movable contact (16) upon pivoting of the lever in a first plane.

6. The lever switch apparatus according to claim 5, further comprising a fourth drive piece (253) formed on the base end of the lever (2), said fourth drive piece (253) being coupled to a fourth movable contact (17) provided in the switch body (1, 1A, 1B) for movement of the fourth movable contact (17) upon pivoting of the lever in a second plane which is generally perpendicular to said first plane.

* * * * *

UNITED STATES PATENT AND TRADEMARK OFFICE
CERTIFICATE OF CORRECTION

PATENT NO. : 5,804,784
DATED : September 8, 1998
INVENTOR(S) : Norio Uchiyama et al.

It is certified that error appears in the above-identified patent and that said Letters Patent is hereby corrected as shown below:

Please change section [73] to reflect the Assignee as follows:
- - Assignee: Niles Parts Co., Ltd., Japan - -

Signed and Sealed this

Eighth Day of August, 2000

Attest:

Q. TODD DICKINSON

Attesting Officer

Director of Patents and Trademarks